(No Model.)
J. FRENIER.
WHEEL.
No. 424,707. Patented Apr. 1, 1890.
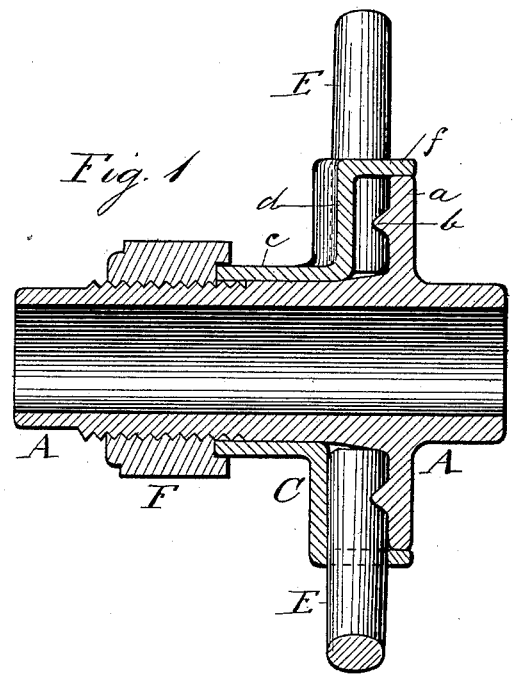
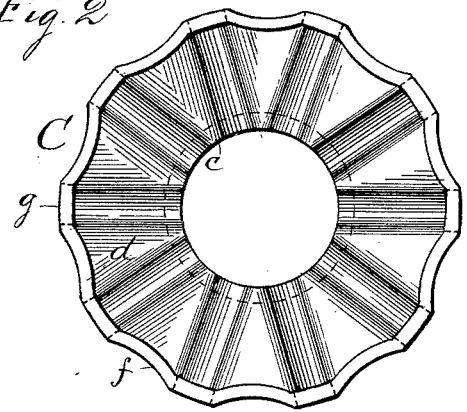
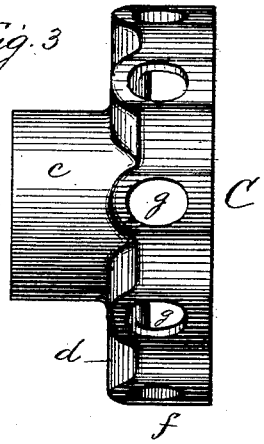
Witnesses.
Otto R. Pabst.
Rudolphe Wm. Lotz
Inventor
Joseph Frenier
By Wm H. Lotz
Attorney

UNITED STATES PATENT OFFICE.

JOSEPH FRENIER, OF BUSHNELL, ILLINOIS.

WHEEL.

SPECIFICATION forming part of Letters Patent No. 424,707, dated April 1, 1890.

Application filed August 26, 1889. Serial No. 322,039. (No model.)

*To all whom it may concern:*

Be it known that I, JOSEPH FRENIER, a citizen of the United States of America, residing at Bushnell, in the county of McDonough and State of Illinois, have invented certain new and useful Improvements in Wheels, of which the following is a specification, reference being had therein to the accompanying drawings.

This invention relates to further improvements on the wheels for which Letters Patent of the United States No. 313,931, dated March 17, 1885, and No. 400,907, dated April 9, 1889, have already been granted to me, and it is the object of this my invention to produce a hub and spoke holder for such wheels that is lighter and stronger, and which can be more readily and snugly fitted for receiving metal spokes made of all shapes; and with these objects in view my invention consists of the novel devices and combinations of devices hereinafter described and specifically claimed.

In the accompanying drawings, Figure 1 represents a section through the center line of the hub; Fig. 2, an end elevation of the spoke-holder, and Fig. 3 a side elevation of the spoke-holder detached.

Corresponding letters of reference in the several figures of the drawings designate like parts.

A denotes the hub-box of the wheel, cast of metal and bored to fit upon the axle-journal. This hub-box has a flange $a$ concentric therewith, and provided with a circular sharp-edged projection $b$ to its inward face. Near flange $a$ outward the hub-box A is a little conical, and thence toward its outward end it is cylindrical, with a screw-thread cut thereon the required length. The spoke-holder C, I have formerly made also of cast-iron, when, however, it was clumsy, and the side bearings for the spokes were rough and uncertain and were difficult to fit, and the spoke-holes had to be drilled, or for shapes of spokes other than round had to be cored and filed for obtaining a good fit and uniform hold for such spokes, all of which required considerable labor. Now, therefore, my principal improvement consists in forming such spoke-holder C of a disk of sheet metal, preferably steel, shaped by compression between dies to assume the shape shown by the drawings—that is, with a sleeve or hub $c$, a flange $d$, radially corrugated to provide concaved recesses as bearings for one side of the spokes E, and a circumferential flange $f$, also somewhat corrugated, the holes $g$ in which for the spoke ends to be inserted now are punched to be on the desired exact position relative to the concaved bearings in flange $d$, and to have a shape corresponding with the shapes of the spokes—oval, square, rectangular, or star-shaped—so as to obtain a perfect close fit without filing and with the least amount of labor. This is particularly desirable, considering that a spoke flattened toward the hub will increase its lateral stiffness to a great extent. Upon the screw-thread of hub-box A is fitted a nut F for forcing the spoke-holder C toward flange $a$ of the hub-box, and the inner end of each spoke E being notched where it engages the sharp-edged circular projection $b$ of flange $a$, the inward ends of the spokes E are not only clamped between the flanges $a$ and $d$, but are held radially rigid by this circular projection $b$. The hub-box A, being conical near its flange, will provide a rigid abutment for the inner ends of the spokes E after their outward ends have been secured into the rim or tire of the wheel. The outer edge of flange $a$ of hub-box A may be provided with corrugations to correspond with the corrugations in flange $f$ of the spoke-holder C, thereby making it impossible for hub-box A to revolve within spoke-holder C.

For small wheels I can tap the hub $c$ of spoke-holder C to engage the screw-threads cut on hub-box A, whereby the nut F may be dispensed with, in which case, however, the outer edge of flange $a$ of hub-box A must be circular, to allow rotation within the rim-flange $f$ of spoke-holder C.

What I claim is—

1. The combination, with the cast-metal hub-box A, having flange $a$, of spoke-holder C, formed of sheet metal, preferably steel, to consist of sleeve or hub $c$, radially-corrugated flange $d$, providing concaved side bearings for the spokes E, and of rim-flange $f$, having punched holes $g$ for the ends of the spokes, all substantially as set forth.

2. The combination, with cast-metal hub-box A, having flange $a$, with circular sharp-edged projection $b$, of spoke-holder C, formed of sheet metal, preferably steel, to consist of sleeve or hub $c$, radially-corrugated flange $d$, providing concaved side bearings for spokes E, and of rim-flange $f$, having punched holes for the ends of the spokes, substantially as set forth.

In testimony whereof I affix my signature in presence of two witnesses.

JOSEPH FRENIER.

Witnesses:
WILLIAM H. LOTZ,
RUDOLPH W. LOTZ.